(12) United States Patent
Kawakami (10) Patent No.: US 7,665,382 B2
(45) Date of Patent: Feb. 23, 2010

(54) BICYCLE SHIFT CONTROL DEVICE

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 587 days.

(21) Appl. No.: 11/348,529

(22) Filed: Feb. 7, 2006

(65) Prior Publication Data
US 2007/0193390 A1    Aug. 23, 2007

(51) Int. Cl.
 *B62M 25/00* (2006.01)
 *B62M 25/04* (2006.01)
(52) U.S. Cl. .............. 74/489; 74/473.14; 74/502.2
(58) Field of Classification Search ............ 74/489, 74/501.6, 500.5, 473.14, 502.2
See application file for complete search history.

(56) References Cited

U.S. PATENT DOCUMENTS

| | | | |
|---|---|---|---|
| 3,972,247 A | 8/1976 | Armstrong | |
| 5,095,768 A * | 3/1992 | Nagano | 74/473.14 |
| 5,241,878 A | 9/1993 | Nagano | |
| 5,257,683 A | 11/1993 | Romano | |
| 5,307,706 A * | 5/1994 | Nagano | 74/502.2 |
| 5,400,675 A | 3/1995 | Nagano | |
| 5,660,083 A | 8/1997 | Huang et al. | |
| 5,732,593 A | 3/1998 | Hwang et al. | |
| 5,775,168 A * | 7/1998 | Furuta | 74/489 |
| 5,791,195 A * | 8/1998 | Campagnolo | 74/473.14 |
| 5,957,002 A | 9/1999 | Ueng | |
| 6,066,057 A | 5/2000 | Nakamura et al. | |
| 6,073,730 A | 6/2000 | Abe | |
| 6,216,078 B1 | 4/2001 | Jinbo et al. | |
| 6,220,111 B1 | 4/2001 | Chen | |
| 6,450,060 B1 * | 9/2002 | Shahana | 74/502.2 |
| 6,502,477 B1 | 1/2003 | Assel | |
| 6,527,095 B2 | 3/2003 | Assel | |
| 6,647,823 B2 | 11/2003 | Tsumiyama et al. | |
| 6,792,826 B2 | 9/2004 | Dal Pra' | |
| 2002/0139637 A1 * | 10/2002 | Tsumiyama et al. | 192/217 |
| 2004/0005947 A1 | 1/2004 | Shahana et al. | |
| 2004/0144193 A1 * | 7/2004 | Sato et al. | 74/502.2 |
| 2004/0237697 A1 * | 12/2004 | Kawakami | 74/501.6 |
| 2005/0126329 A1 | 6/2005 | Blaschke | |
| 2005/0155447 A1 | 7/2005 | Ichida et al. | |

(Continued)

FOREIGN PATENT DOCUMENTS

DE    102 00 700 A1    7/2002

(Continued)

*Primary Examiner*—Richard W L Ridley
*Assistant Examiner*—Thomas Diaz
(74) *Attorney, Agent, or Firm*—Global IP Counselors, LLP (57) ABSTRACT

A bicycle shift control device is provided with a shift winding member, a winding pawl, a winding member return element, a gear shifting mechanism and a winding pawl biasing element. The winding member is movably arranged between a rest position and a shifting position. The winding pawl moves in response to movement of the winding member. The winding member return element biases the winding member to the rest position and to bias the winding pawl to a pawl engagement position when the winding member is moved from the rest position towards the shifting position. The gear shifting mechanism includes winding teeth that are engaged with the winding pawl. The winding pawl biasing element applies a biasing force to the winding pawl that urges the winding pawl to the pawl engagement position when the winding member is in the rest position.

17 Claims, 9 Drawing Sheets

U.S. PATENT DOCUMENTS

| | | | |
|---|---|---|---|
| 2006/0016288 A1* | 1/2006 | Kawakami | 74/502.2 |
| 2007/0017316 A1* | 1/2007 | Tsumiyama | 74/502.2 |

FOREIGN PATENT DOCUMENTS

| | | |
|---|---|---|
| EP | 0 406 813 A2 | 1/1991 |
| EP | 1 134 158 A2 | 9/2001 |
| EP | 1 232 940 A2 | 8/2002 |
| EP | 1 245 483 A2 | 10/2002 |
| EP | 1 327 576 A2 | 7/2003 |
| EP | 1 440 878 A2 | 7/2004 |
| EP | 1 502 847 A1 | 2/2005 |
| FR | 2 861 686 A1 | 5/2005 |

* cited by examiner

BICYCLE SHIFT CONTROL DEVICE

BACKGROUND OF THE INVENTION

1. Field of the Invention

This invention generally relates to a bicycle control device. More specifically, the present invention relates to a bicycle shift control device that performs shifting operations including a winding operation without a lost motion occurring during movement of a winding lever.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for shifting have been extensively redesigned in recent years.

Currently, there are many types of cable operated shifting devices currently being installed on bicycles. For example, some cable operated shifting devices have a pair of shift levers and a cable winding mechanism that rotates via a ratchet mechanism. With conventional cable operated shifting devices of this type, operation of one of the shift lever causes the cable winder to rotate via the ratchet mechanism in one direction by one gear at a time. As a result, the cable is wound around the cable winder, and a shift is made by the shift mechanism from one gear to the next gear. Operation of the other shift lever causes the ratchet mechanism to be released and the cable winder to rotate in the other direction by one gear at a time. As a result, the cable that was wound on the cable winder is played out, and a shift is made in the opposite direction by the shift mechanism. More recently, some cable operated shifting devices have been developed that allow multiple gear shifts in a single operation of one of the shift levers. These prior shifting devices can be complicated and expensive to manufacture and assemble. Furthermore, these prior shifting devices are sometimes heavy and/or cumbersome.

Also in some of these prior shifting devices, a winding pawl is used to rotate a wire takeup member by engaging a set of winding ratchet teeth of a ratchet wheel that is mounted to the wire takeup member. The winding pawl is engaged with one of the winding ratchet tooth in a rest position. In some of these prior shifting devices, when a rider moves the winding lever, the winding pawl immediately rotates the wire takeup member which integrally rotates with the ratchet wheel. However, in other prior shifting devices, the winding pawl is disengaged from the winding ratchet teeth in a rest position. In this case, some amount of movement of the winding lever is required before the wire takeup member begins to rotate. In other words, some of prior shifting devices have some lost motion occurring in the winding lever.

In the shifting devices without lost motion, positioning teeth for holding the wire takeup member are formed on the same plate or at least they move integrally with the winding ratchet teeth. Thus, when one of the positioning teeth is caught (positioned) by a positioning pawl, the positions of the winding ratchet teeth are automatically fixed. Therefore, in these shifting devices without lost motion, it is theoretically possible to design the rest position of the winding pawl to be at the bottom of the winding teeth. If this type of design is created, there is no lost motion, that is, when the winding lever is rotated, the wire takeup member is immediately rotated by the winding pawl. However, in a mass production, it is not easy to precisely position the winding pawl relative to the positioning pawl(s) and the ratchet wheel and so on. Therefore, some manual adjustment would be necessary in order to assembly a shifting device having such a design. This type of shifting device can be very time consuming to assemble, and thus, increase the manufacture costs of the shifting device.

In view of the above, it will be apparent to those skilled in the art from this disclosure that there exists a need for an improved bicycle control (shifting) device. This invention addresses this need in the art as well as other needs, which will become apparent to those skilled in the art from this disclosure.

SUMMARY OF THE INVENTION

One object of the present invention is to provide a bicycle shift control device with a winding member that immediately rotates a wire takeup member without any lost motion.

Another object of the present invention is to provide a bicycle shift control device that is relatively simple to assembly.

The present invention was conceived in view of these objects. The foregoing objects can basically be attained by providing a bicycle shift control device that is basically provided with a shift winding member, a winding pawl, a winding member return element, a gear shifting mechanism and a winding pawl biasing element. The winding member is movably arranged between a rest position and a shifting position. The winding pawl is moved in response to movement of the winding member. The winding member return element is configured and arranged to bias the winding lever to the rest position and to bias the winding pawl to a pawl engagement position when the winding member is moved from the rest position towards the shifting position. The gear shifting mechanism includes winding teeth that are engaged with the winding pawl. The winding pawl biasing element is configured and arranged to apply a biasing force to the winding pawl that urges the winding pawl to the pawl engagement position when the winding member is in the rest position.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
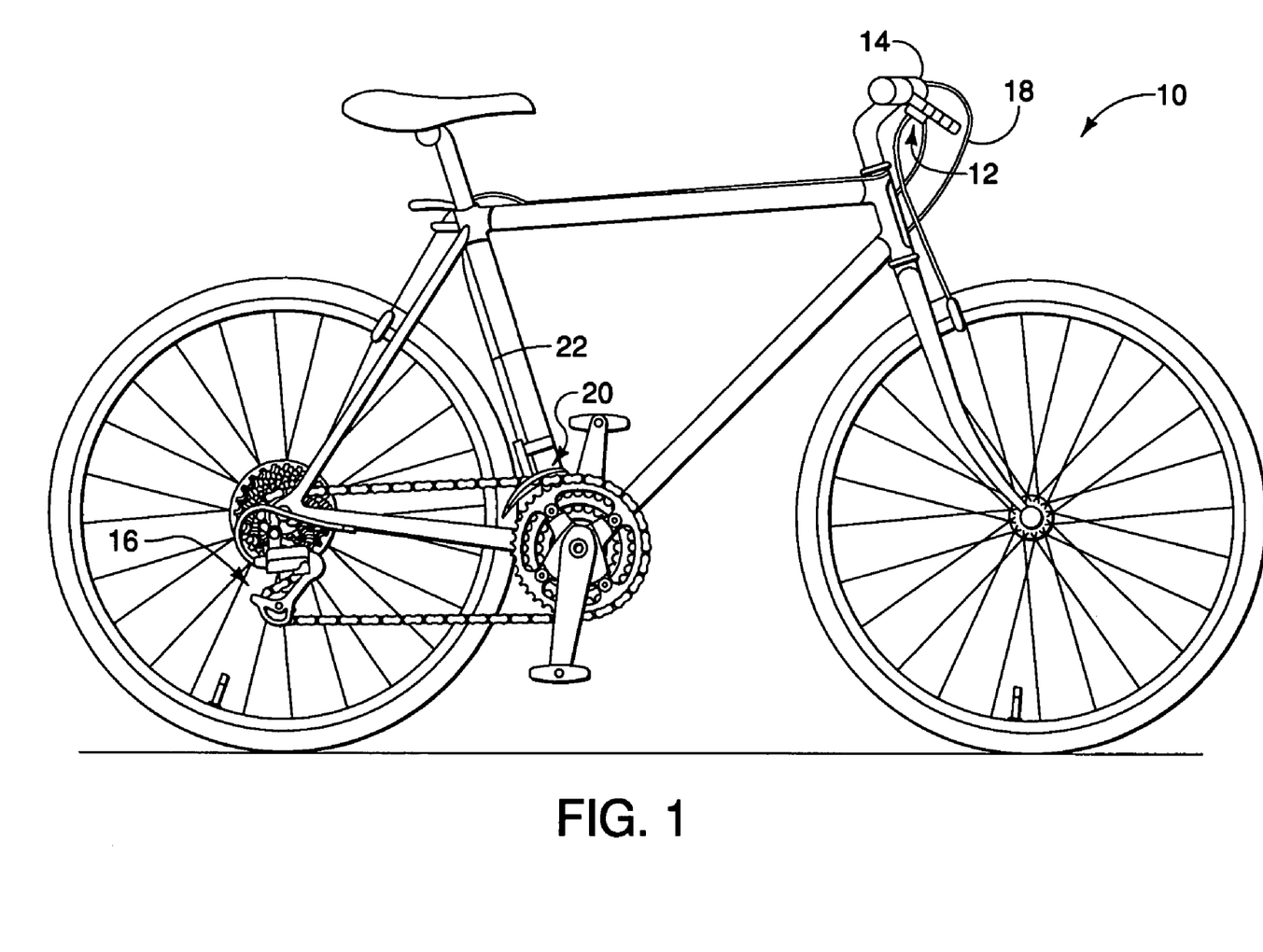
FIG. 1 is a side elevational view of a bicycle equipped with a pair of control devices (only one shown) in accordance with a first embodiment of the present invention.

Referring initially to FIG. 1, a bicycle 10 is illustrated with a bicycle control device 12 mounted on a bicycle handlebar 14 in accordance with one embodiment of the present invention. The bicycle control device 12 is a right hand side control device 12 operated by the rider's right hand. The bicycle control device 12 is preferably operatively coupled to a rear derailleur 16 via a shift control cable 18.

Preferably, the bicycle 10 includes a left hand side bicycle control device (not shown) that is substantially identical to the bicycle control device 12, except for the shifting unit has been modified to reduce the number of gears that can be shifted. Preferably, the left hand side bicycle control device is operatively coupled to a front derailleur 20 via a shift control cable 22. Alternatively, the control devices can be switched so that the rider can operate the rear derailleur 16 and the front derailleur 20 with opposite hands. In any event, the left hand side bicycle control device is essentially identical in construction and operation to the control device 12, except that it is a mirror image of the control device 12 and the number of shift positions for the left hand side bicycle control device is different. Thus, only the control device 12 will be discussed and illustrated herein. Preferably, the cables 18 and 22 are conventional bicycle cables that have an outer casing the covers an inner wire. For example, the shift control cable 18 has an inner wire 18a and an outer casing 18b.

Since most of the parts of the bicycle 10 are well known in the art, the parts of the bicycle 10 will not be discussed or illustrated in detail herein, except for the parts that relate to the present invention. In other words, only the parts related to the bicycle control device 12 will be discussed and illustrated in detail herein. Moreover, various conventional bicycle parts such as brakes, additional sprockets, derailleurs, etc., which are not illustrated and/or discussed in detail herein, can be used in conjunction with the present invention.

Figure 2:
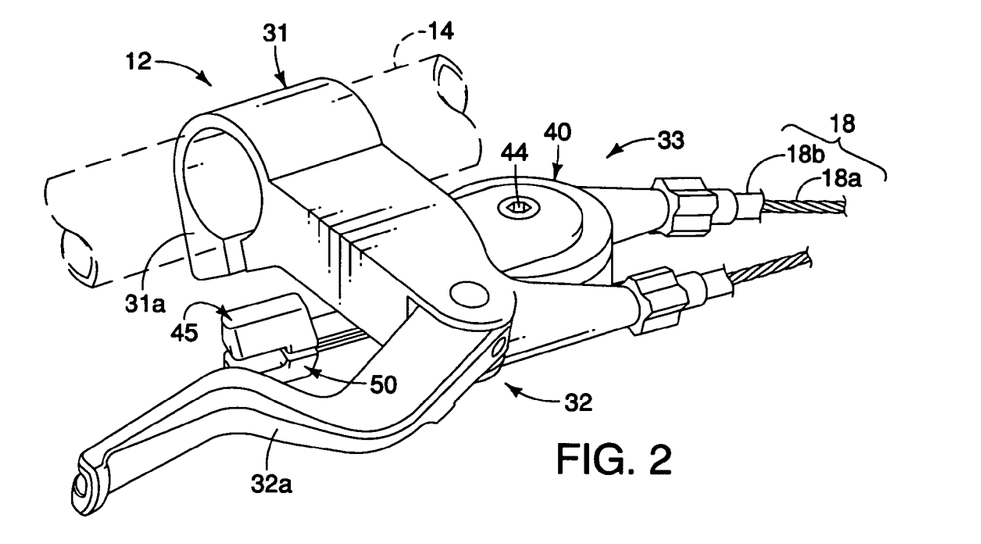
FIG. 2 is an enlarged perspective view of the bicycle control device illustrated in FIG. 1 in accordance with the first embodiment of the present invention.
Figure 3:
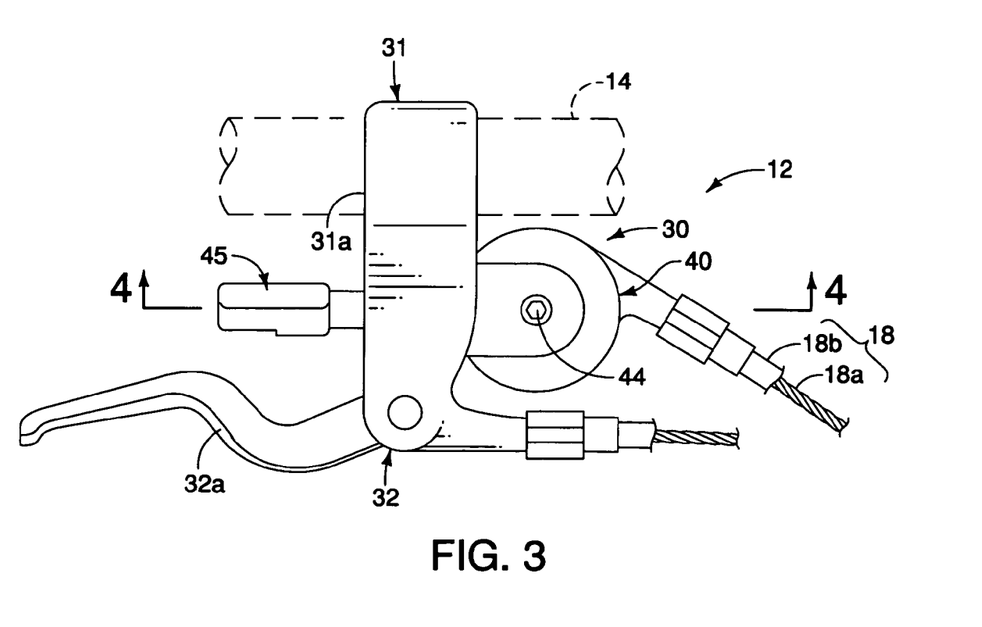
FIG. 3 is a top plan view of the bicycle control device illustrated in FIGS. 1 and 2, with the operating members (shift levers) in the rest position.
Figure 4:
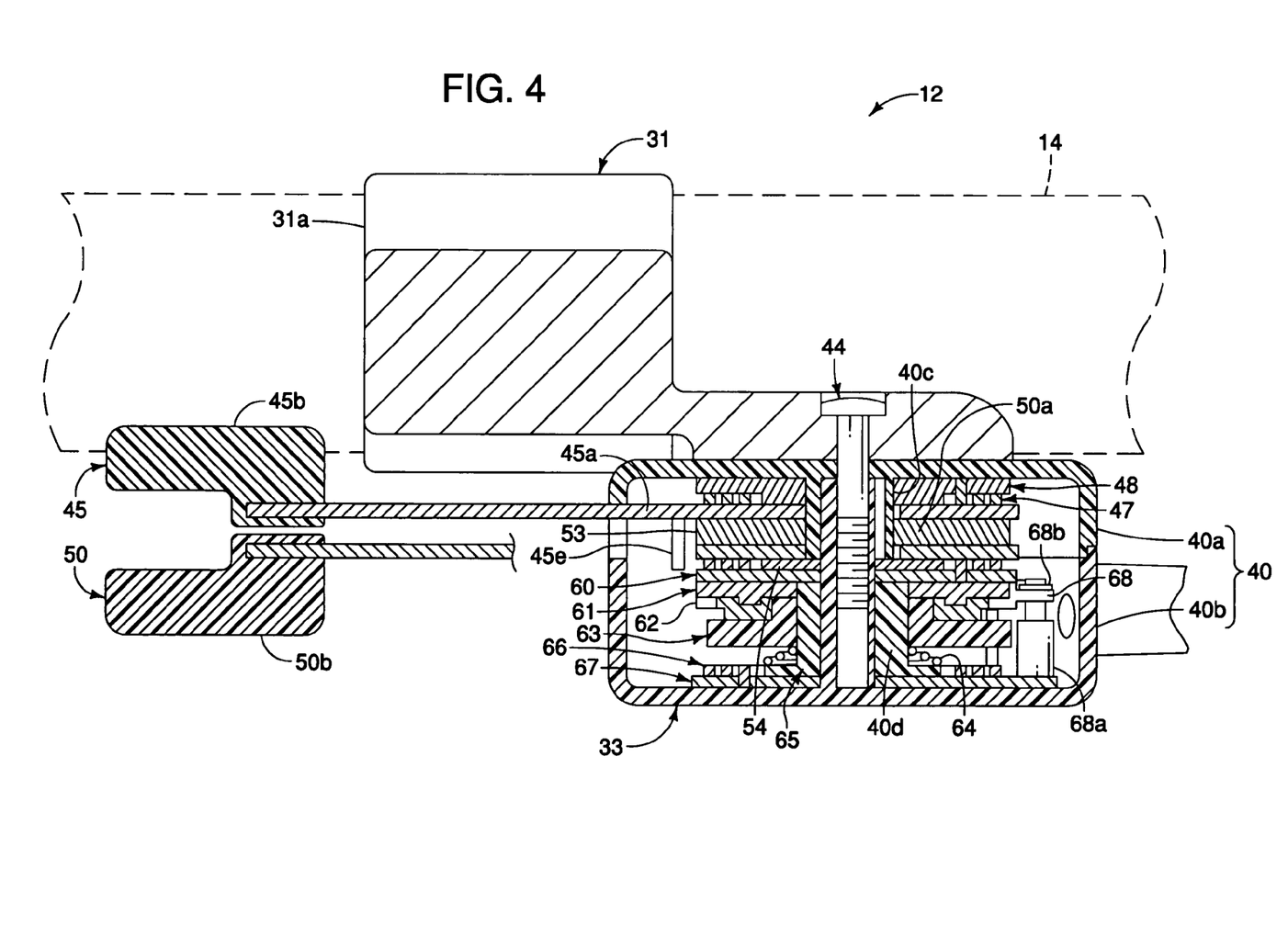
FIG. 4 is a partial cross sectional view of the bicycle control device as viewed along section line 4-4 of FIG. 3.

Referring now to FIGS. 2-4, the bicycle control device 12 is illustrated in the rest position. The bicycle control device 12 basically includes a bicycle handlebar mounting portion 31, a braking unit 32 and a shifting unit 33. In this embodiment, the braking unit 32 and the shifting unit 33 are integrated into the mounting portion 31. As best seen FIG. 2, the handlebar mounting portion 31 has a clamping section 31a that is preferably a split bore type of clamping arrangement in which the diameter of the bore is varied by a fixing bolt in a conventional manner. The clamping section 31a is relatively conventional in construction, and thus, will not be discussed or illustrated in further detail herein. The braking unit 32 has a brake lever 32a that is pivotally mounted to the bicycle handlebar mounting portion 31 to pull and release an inner wire of a brake cable in a conventional manner. The configuration of the braking unit 32 can be any configuration, and thus, will not be discussed in further detail herein. In fact, the braking unit 32 can be eliminated from the bicycle control device 12 as needed and/or desired.

The shifting unit 33 basically includes a housing 40, a shift wire releasing assembly 41, a shift wire winding assembly 42 and a bicycle shift position control mechanism 43. The shifting unit 33 is configured and arranged such that the inner wire 18a of the shift control cable 18 can be pulled and released to selectively effect either a single-stage gear shift operation or a multiple-stage gear shift operation in a single progress shifting operation as explained below. The shift position control mechanism 43 constitutes a gear shifting mechanism of the present invention that cooperates with the shift wire releasing assembly 41 and the shift wire winding assembly 42 to release and wind the inner wire 18a to operate the rear derailleur 16.

Figure 5:
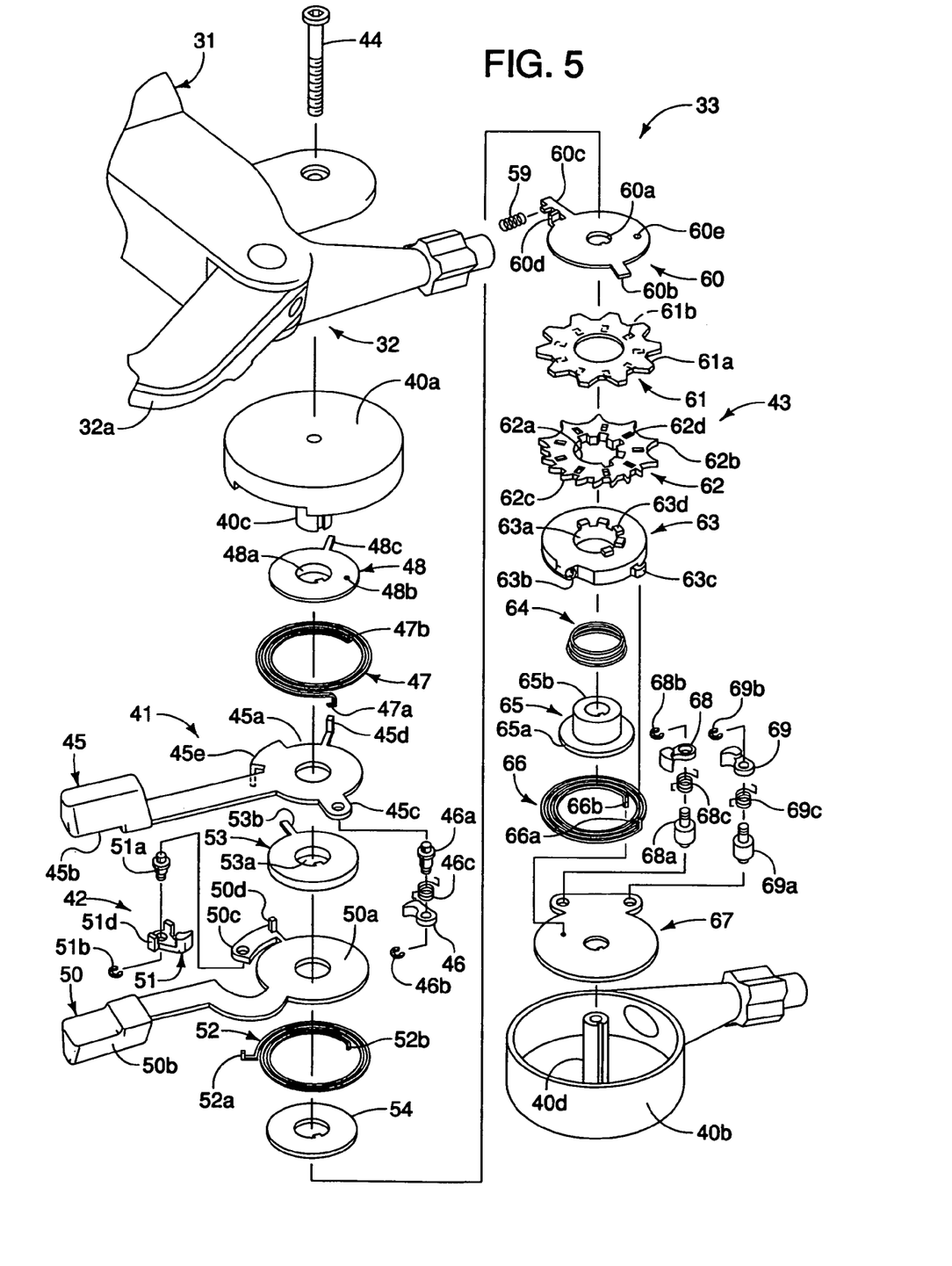
FIG. 5 is an exploded perspective view of the bicycle control device illustrated in FIGS. 1-4 in accordance with the first embodiment of the present invention.

As best seen FIG. 5, the housing 40 of the shifting unit 33 basically includes an upper casing 40a and a lower casing 40b that are coupled together by a fastener or screw 44. The upper and lower casings 40a and 40b are preferably constructed of a light weight material such a hard rigid plastic material. The housing 40 is sized and configured to form an internal cavity for receiving the shift wire releasing assembly 41, the shift wire winding assembly 42 and the shift position control mechanism 43 therein. The upper casing 40a is provided with an upper keyed shaft or post 40c, while the lower casing 40b is provided with a lower keyed shaft or post 40d. The posts 40c and 40d are designed to prevent rotational movement of selected parts of the shift unit 33 as will become apparent from the description below.

As best seen FIG. 5, the shift wire releasing assembly 41 of the shifting unit 33 basically includes a shift release lever 45 with a release pawl 46, a shift release lever return spring 47 and a shift release lever control plate 48. The shift wire releasing assembly 41 is configured and arranged such that the rider can easily operate the shift release lever 45 to perform a shifting operation as FIGS. 13-15.

The release lever 45 is operatively coupled to the shift position control mechanism 43 that constitutes the gear shifting mechanism of the present invention. Thus, the release lever 45 operates the shift position control mechanism 43 to cause the inner wire 18a to be released in response to movement of the release lever 45 from a rest position towards a release (shifting) position. The shift release lever 45 preferably has an internal mounting portion 45a and an external rider operating portion 45b. The internal mounting portion 45a is configured and arranged to pivot around the outer periphery of the upper post 40c such that the shift release lever 45 can move between a rest position and a shift release position. The internal mounting portion 45a preferably includes a mounting tab 45c for pivotally supporting the release pawl 46 and a stop flange 45d for maintaining the shift release lever 45 in the rest position due to the biasing force of the release lever return spring 47. Thus, movement of the shift release lever 45 causes the release pawl 46 to rotate therewith about the center axis of the upper post 40c. The internal mounting portion 45a also preferably includes a flange or abutment 45e that engages the shift wire winding assembly 42 to disengage the shift wire winding assembly 42 from the shift position control mechanism 43 during rotation of the shift release lever 45.

The release pawl 46 is mounted to the mounting tab 45c via a mounting pin 46a that is riveted onto the mounting tab 45c. The release pawl 46 is held on the mounting pin 46a by a retaining clip 46b. Moreover, the release pawl 46 is biased in a counterclockwise direction by a torsion spring 46c as seen in FIG. 5. The torsion spring 46c has a first end of the torsion spring 46c engaging the release pawl 46 and a second end of the torsion spring 46c engaging the mounting tab 46c of the shift release lever 45. As explained below, the release pawl 46 is configured and arranged to selectively engage the shift position control mechanism 43 when the shift release lever 45 is pivoted from its rest position to its shift release position.

The release lever return spring 47 is preferably a torsion spring having a first end 47a engaging the shift release lever 45 and a second end 47b engaging the shift release lever control plate 48. The release lever return spring 47 biases the shift release lever 45 in a clockwise direction as seen in FIG. 5. Accordingly, the shift release lever 45 and the release lever return spring 47 cooperate together such that the shift release lever 45 as a trigger action in which the shift release lever 45 automatically springs back to its rest position after being moved to a shift release position. Preferably, the first end 47a of the release lever return spring 47 is hooked on to the mounting tab 45c to bias the shift release lever 45 in the clockwise direction.

The shift release lever control plate 48 is preferably a flat plate with a center opening 48a that is keyed such that it engages the upper post 40c to prevent rotational movement therebetween. The shift release lever control plate 48 also has a hole 48b for receiving the second end 47b of the shift lever return spring 47 therein. A stop member or flange 48c is formed on the outer periphery of the shift release lever control plate 48 to act as a stop for the shift release lever 45. In particular, the stop flange 45d of the shift release lever 45 is normally biased against the stop member 48c.

As best seen FIG. 5, the shift wire winding assembly 42 of the shifting unit 33 basically includes a shift winding lever 50 with a winding pawl 51, a shift winding lever return spring 52 and a shift winding lever control plate 53. The shift wire winding assembly 42 is configured and arranged so that the rider can easily operate the shift winding lever 50 to perform a shift winding operation as illustrated in FIGS. 6-12. While the shift wire winding assembly 42 utilizes a pivoting lever arrangement, it will be apparent to those skilled in the art from this disclosure that other operating members can be utilizes to carry out the present invention. Thus, the shift winding lever 50 is one form of a shift winding member that is movable between a rest position and a shifting position.

The shift winding lever 50 basically includes an internal mounting portion 50a and an external rider operating portion 50b. The internal mounting portion 50a is configured and arranged to pivot around the outer periphery of the upper post 40c such that the shift winding lever 50 can move between a rest position and a shift winding position. The internal mounting portion 50a preferably includes a mounting tab 50c for pivotally supporting the winding pawl 51 and a stop flange 50d for maintaining the shift winding lever 50 in the rest position due to the biasing force of the winding lever return spring 52. Thus, movement of the shift winding lever 50 causes the winding pawl 51 to rotate therewith about the center axis of the upper post 40c.

Figure 6:
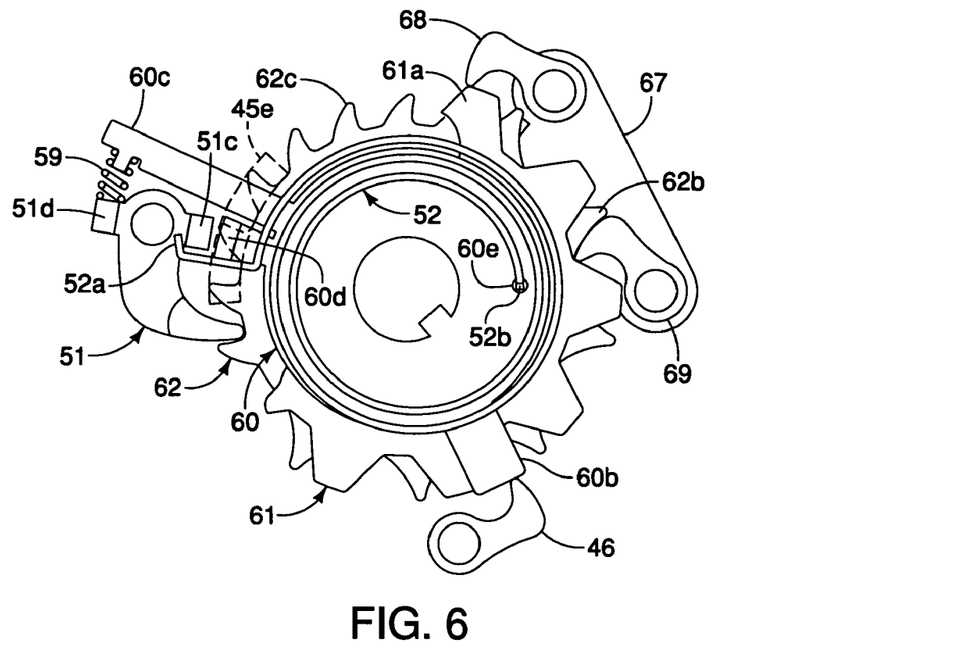
FIG. 6 is a simplified top plan view of selected parts of the shift position control mechanism for the bicycle control device illustrated in FIGS. 1-5, with the positioning plate and the releasing plate in their normal rest positions when the bicycle control device is in the first gear position, i.e., the inner wire of the rear shift cable being fully released from the wire takeup member.

As explained below, the winding pawl 51 is configured and arranged to operate the shift position control mechanism 43 when the winding lever 50 is pivoted from its rest position to its shift release position. The winding pawl 51 is mounted to the mounting tab 50c via a mounting pin 51a that is riveted onto the mounting tab 50c. The winding pawl 51 is held on the mounting pin 51a by a retaining clip 51b. The winding pawl 51 has a pair of biasing tabs 51c and 51d that are configured and arranged to receive an urging force to rotate the winding pawl 51 in a counterclockwise direction as seen in FIG. 5. In particular, the biasing tabs 51d is configured and arranged to receive an urging force from the shift position control mechanism 43, as discussed below, when the winding lever 50 is in the rest position as seen in FIGS. 6 and 12. The biasing tabs 51c, on the other hand, is configured and arranged to receive an urging force from the winding lever return spring 52 as seen in FIGS. 7-11.

Generally speaking, the winding lever return spring 52 is specific type of a winding member return element that is configured and arranged to bias the winding lever 50 to the rest position and to bias the winding pawl 51 to a pawl engagement position when the winding lever 50 is moved from the rest position towards the shifting position as seen in FIG. 6-11. The winding lever return spring 52 is preferably a torsion spring having a first end 52a engaging the winding pawl 51 and a second end 52b being fixed as explained below. Preferably, the first end 52a of the winding lever return spring 52 is hooked onto the tab 51c of the winding pawl 51 to bias the shift winding lever 50 in the clockwise direction. Since the winding pawl 51 is mounted to the shift winding lever 50, the force of the winding lever return spring 52 is transmitted from the winding pawl 51 to the winding lever 50. Thus, the winding lever return spring 52 pivots the winding pawl 51 to the pawl engagement position and biases the shift winding lever 50 in a clockwise direction as seen in FIG. 5. Accordingly, the shift winding lever 50 and the winding lever return spring 52 cooperate together such that the shift winding lever 50 as a trigger action in which the shift winding lever 50 automatically springs back to its rest position after being moved to a shift release position. A spacer 54 is provided in the center of the coiled portion of the winding lever return spring 52 to prevent the winding lever return spring 52 from being compressed in the axial direction.

The shift winding lever control plate 53 is preferably a flat plate with a center opening 53a that is keyed such that it engages the upper post 40c to prevent rotational movement therebetween. A stop member or flange 53b is formed on the outer periphery of the shift winding lever control plate 53 to act as a stop for the shift winding lever 50. In particular, the stop flange 50d of the shift winding lever 50 is normally biased against the stop member 53b.

As best seen FIG. 5, the gear shifting mechanism or shift position control mechanism 43 of the shifting unit 33 basically includes a winding pawl biasing element 59, a pawl control plate 60, a releasing member or plate 61, a positioning member or plate 62, a wire takeup member 63, a compression spring 64, a spacer 65, a wire takeup release spring or biasing member 66, a mounting plate 67, a first position maintaining member or pawl 68 and a second position maintaining member or pawl 69. The shift position control mechanism 43 is operatively coupled to the release lever 45 to cause the wire takeup member 63 to rotate in a wire unwinding direction in response to movement of the release lever 45 from the rest position towards a shifting position. The shift position control mechanism 43 is operatively coupled to the winding lever 50 to cause the wire takeup member 63 to rotate in a wire winding direction in response to movement of the winding lever 50 from the rest position towards a shifting position.

Figure 7:
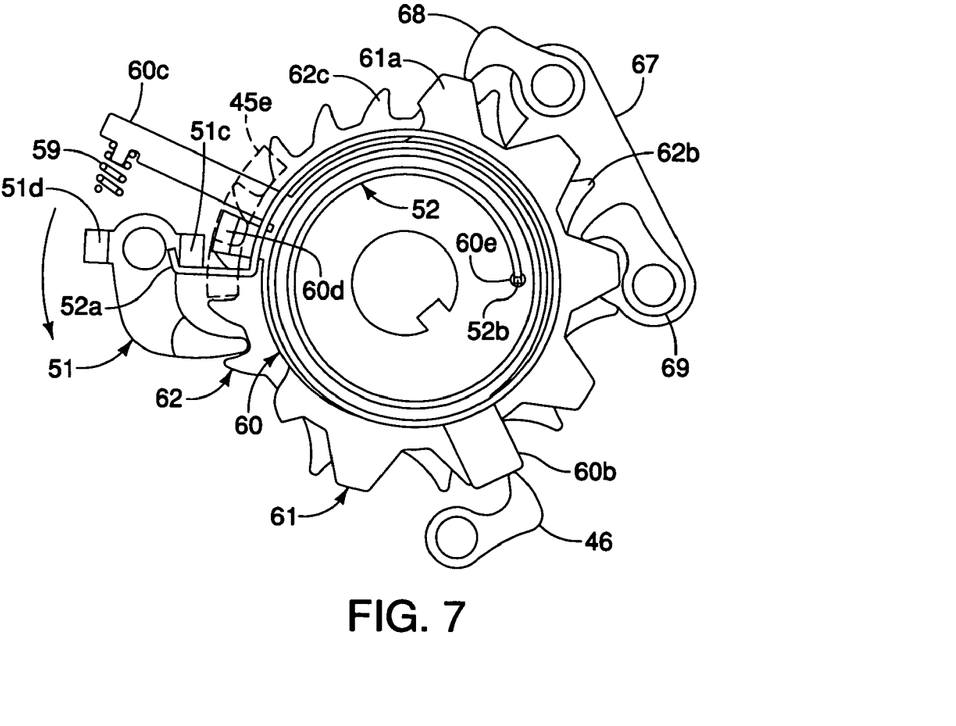
FIG. 7 is a simplified top plan view of the selected parts of the shift position control mechanism illustrated in FIG. 6, with the positioning plate and the releasing plate being rotated together by the winding lever in the shift winding direction such that the releasing plate moves the first and second position maintaining members or pawls out of engagement with the positioning plate and the releasing plate for performing a shifting operation with the parts being shown at an intermediate position.
Figure 8:
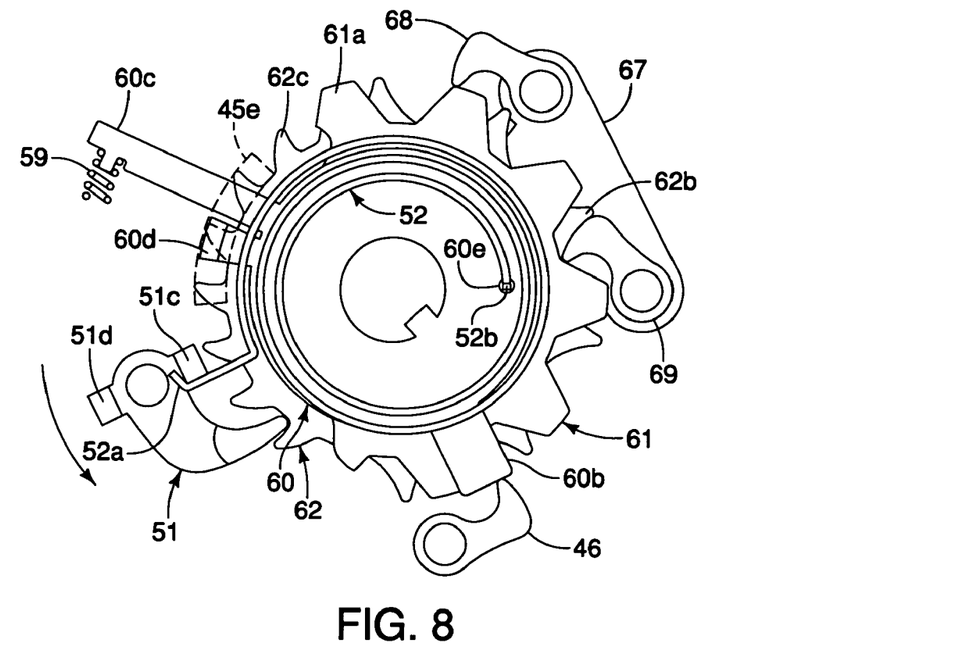
FIG. 8 is a simplified top plan view of the selected parts of the shift position control mechanism illustrated in FIGS. 6 and 7, with the positioning plate and the releasing plate in their normal rest positions when the bicycle control device is in the third gear position, but prior to the winding lever returning to its rest position.
Figure 9:
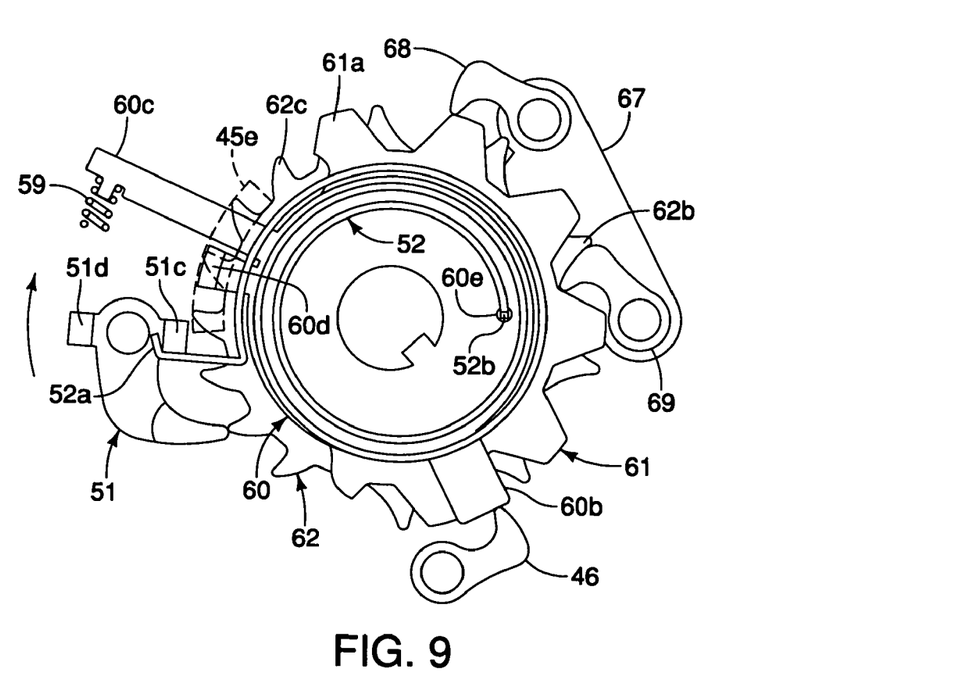
FIG. 9 is a simplified top plan view of the selected parts of the shift position control mechanism illustrated in FIGS. 6-8 in the third gear position, with the winding lever being returned to its rest position.

The winding pawl biasing element 59 is configured and arranged to apply a biasing force to the winding pawl 51 that urges the winding pawl 51 to the pawl engagement position when the winding lever 50 is in the rest position as seen in FIG. 6. Preferably, the winding pawl biasing element 59 is a compression spring that is retained on the pawl control plate 60. The winding pawl biasing element 59 is further configured and arranged such that the winding pawl biasing element 59 is disengaged from the winding pawl 51 upon movement of the winding lever 50 to its shifting position as seen in FIGS. 7-9.

The pawl control plate 60 is a flat rigid metal plate that is fixed to the housing 40 so that it does not rotate or move. In particular, the pawl control plate 60 has a center opening 60a that is keyed so as to mate with the post 40c of the upper casing 40a. Of course, other non-circular cross sections can be utilized to prevent relative rotation between the pawl control plate 60 and the housing 40. The pawl control plate 60 preferably includes a release pawl holding projection 60b, a winding pawl control projection 60c and a return spring stop 60d. A hole 60e is also provided in the pawl control plate 60 for receiving the second end 52b of the winding lever return spring 52 therein.

The projections 60b and 60c are preferably formed peripheral edge of the pawl control plate 60. The release pawl holding projection 60b is configured and arranged to hold the release pawl 46 in a disengaged or rest position against the biasing force of the spring 46c. The winding pawl control projection 60c is configured and arranged to support the winding pawl biasing element 59 so as to selectively engage the winding pawl 51 as particularly seen in FIGS. 6-12. The return spring stop 60d is configured and arranged to catch the first end 52a of the winding lever return spring 52 when the winding lever 50 is in the rest position. In other words, the return spring stop 60d constitutes a stationary stop that is arranged to contact the winding lever return spring 52 when the winding lever 50 is in the rest position. Thus, when the winding lever 50 is in the rest position, the first end 52a of the winding lever return spring 52 is disengaged from the tab 51c of the winding pawl 51. However, when the winding lever 50 is in the rest position, the winding pawl biasing element 59 urges the winding pawl 51 in the clockwise direction as seen in FIGS. 6 and 12. In particular, the winding pawl biasing element 59 contacts the tab 51d of the winding pawl 51 to apply an urging force to the winding pawl 51 in the clockwise direction.

The releasing member or plate 61 is preferably a flat metal plate that is mounted on the post 40d to rotate around the peripheral surface of the post 40d. The releasing plate 61 is configured and arranged to selectively move the first position maintaining pawl 68 between a first engagement position and a first disengagement position, and to selectively move the second position maintaining pawl 69 between a second engagement position and a second disengagement position as will become apparent from the following discussion. Moreover, the releasing plate 61 is configured and arranged to selectively release the positioning plate 62 from the first and second position maintaining pawls 68 and 69 to cause the positioning plate 62 to rotate one shift position of the predetermined shift positions when the releasing plate 61 is moved a first predetermined amount by the shift release lever 45, and to cause the positioning member to rotate two consecutive shift positions of the predetermined shift positions when the releasing plate 61 is moved a second predetermined amount in a single progressive shift operation of the shift release lever 45.

The release plate 61 is rotated in a counterclockwise direction by the shift release lever 45. Preferably, the shift release lever 45 and the releasing plate 61 are configured and arranged such that multiple shifting operations are possible with a single progressive movement of the shift release lever 45. The releasing plate 61 includes a plurality of camming teeth 61a which are selectively engaged by the release pawl 46 for rotating the releasing plate 61. The release plate 61 also includes a plurality of ramp shaped detents 61b that are circumferentially spaced apart on its lower surfaces to form part of a one way clutch that cooperates with the positioning member 62 so that the releasing plate 61 can rotate in a counterclockwise direction relative to the positioning plate 62.

The positioning member or plate 62 is preferably a flat metal plate that is rotatable about the post 40c. The positioning plate 62 is fixed to the wire takeup member 63 such that they rotate together in response to movement of either the shift release lever 45 or the shift winding lever 50. More specifically, the positioning plate 62 is biased in a clockwise direction by the wire takeup release spring 66, but normally held in one of the nine shift positions by either the first position maintaining pawl 68 or the second position maintaining pawl 69.

The positioning plate 62 preferably includes a non-circular opening 62a that is configured and arranged to mate with the wire takeup member 63 to prevent relative rotation therebetween. Preferably, the peripheral surface of the positioning plate 62 is provided with six shift positioning teeth 62b and eight shift winding teeth 62c. The shift positioning teeth 62b are configured and arranged to selectively engage the first and second position maintaining pawls 68 and 69 such that the wire takeup member 63 can be selectively held in one of the eight different shift positions. The shift winding teeth 62c are configured and arranged to be selectively engaged by the tooth of the winding pawl 51 of the shift winding lever 50. Normally, the winding pawl 51 remains engaged with the shift winding teeth 62c, except during movement of the shift release lever 45 in which the abutment 45e engages the tip of the winding pawl 51 to disengage the winding pawl 51 from the shift winding teeth 62c.

The positioning plate 62 also includes a plurality of ramp shaped recesses 62d which engage the ramp shaped detents 61b to allow rotational movement in only one direction. In particular, the ramp shaped detents 61b and the ramp shaped recesses 62d cooperate together with the compression spring 64 to form a one way clutch. Thus, the releasing plate 61 rotates independently in a counterclockwise direction relative to the positioning plate 62 when the releasing plate 61 is rotated, but the releasing plate 61 and the positioning plate 62 move together in the counterclockwise direction when the positioning plate 62 is rotated. In other words, the releasing plate 61 is fixed to the positioning plate 62 by the ramp shaped detents 61b and the ramp shaped recesses 62d when the positioning member 62 is rotated in the counterclockwise direction by the winding pawl 51 engaging one of the shift winding teeth 62c. However, the releasing plate 61 rotates relative to the positioning plate 62 when the releasing plate 61 is rotated in a counterclockwise direction and the positioning plate 62 is rotated in the clockwise direction by the wire takeup release spring 66.

In particular, when the shift winding lever 50 is in the rest position, the winding pawl 51 is held engaged with one of the shift winding teeth 62c of the positioning plate 62 by the winding pawl biasing element 59 contacting the tab 51d of the winding pawl 51 in the clockwise direction as seen in FIG. 6. However, as seen in FIGS. 7 and 8, when the shift winding lever 50 is rotated from its rest position to the shift position, then the tab 51c of the winding pawl 51 is caught by the first end 52a of the winding lever return spring 52 to maintain engagement between the winding pawl 51 and the shift winding teeth 62c as the positioning plate 62 is rotated by the winding pawl 51. Since the positioning plate 62 is connected to the wire takeup member 63, the positioning plate 62 and the wire takeup member 63 move together. Also, due to the one way clutch form between the releasing plate 61 and the positioning plate 62, the releasing plate 61 and the positioning plate 62 also rotate together in response to movement of the shift winding lever 50.

Figure 10:
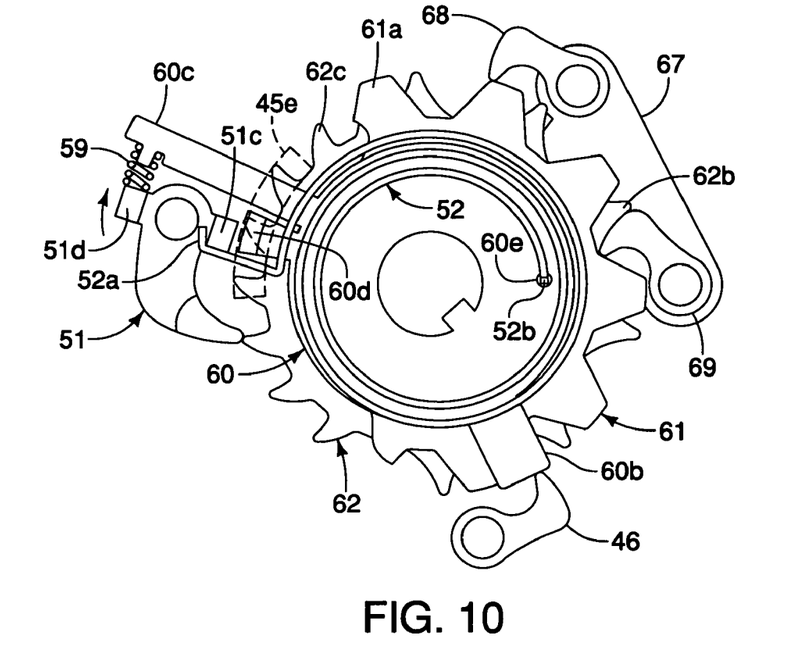
FIG. 10 is a simplified top plan view of the selected parts of the shift position control mechanism illustrated in FIGS. 6-9 in the third gear position, with the winding lever in a position just immediately prior to its rest position.
Figure 11:
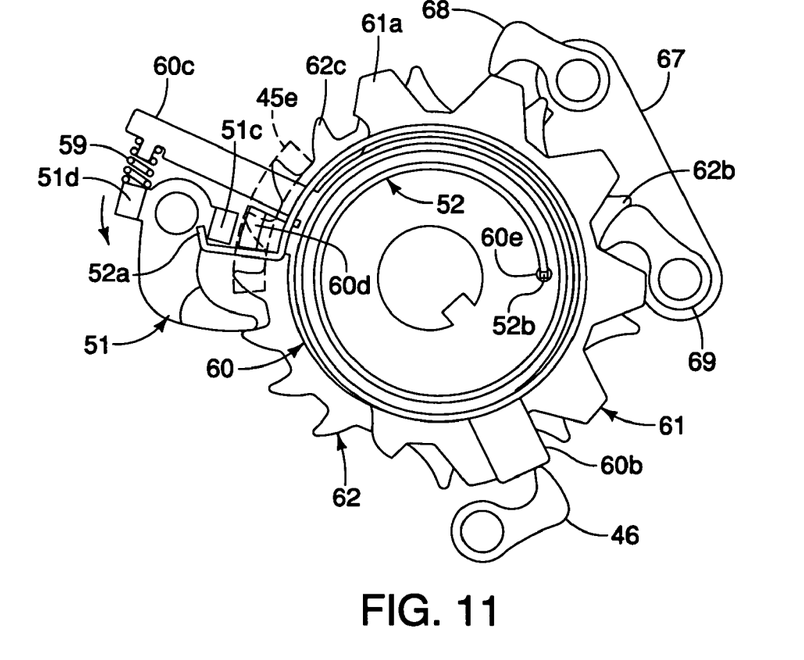
FIG. 11 is a simplified top plan view of the selected parts of the shift position control mechanism illustrated in FIGS. 6-10 in the third gear position, with the winding lever in its final rest position but prior to the winding pawl being moved to its final rest position.
Figure 12:
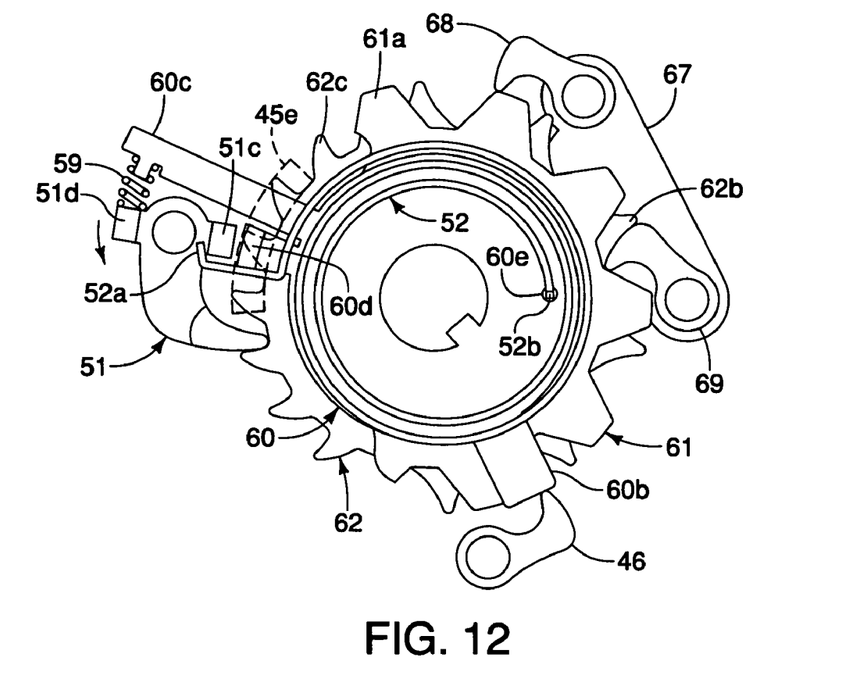
FIG. 12 is a simplified top plan view of the selected parts of the shift position control mechanism illustrated in FIGS. 6-11 in the third gear position, with the winding lever in its final rest position but after the winding pawl has moved to its final rest position.

When the rider releases the shift winding lever 50, the winding lever return spring 52 urges the shift winding lever 50 together with the winding pawl 51 back to the rest position as seen in FIGS. 10-12. As seen in FIG. 11, when the winding lever 50 reaches its rest position, the winding pawl 51 may not reach its bottom position in which tip of the winding pawl 51 fully engage with one of the shift winding teeth 62c of the positioning plate 62. However, as seen in FIG. 12, the winding pawl 51 further rotates and fully engages one of the shift winding teeth 62c of the positioning plate 62. Of course, when the winding lever 50 reaches its rest position, if the winding pawl 51 reaches its bottom position in which tip of the winding pawl 51 fully engage with one of the shift winding teeth 62c of the positioning plate 62, further rotation of the winding pawl 51 doesn't happen. Accordingly, in this mechanism, small amount of difference from ideal position of the winding pawl 51 can be absorbed. Therefore, additional adjustment work in assemble line is not necessary.

The wire takeup member 63 is a conventional type wire takeup spool in which the inner wire 18a is round along the peripheral edge surface of the wire takeup member 63 as the wire takeup member 63 is rotated in a counterclockwise direction. Thus, the wire takeup member 63 has a center opening 63a that is rotatably mounted on the post 40c. The peripheral edge of the wire takeup member 63 has a wire attachment opening 63b for attaching the inner wire 18a of the shift cable 18 thereto. Also, the peripheral edge of the wire takeup member 63 has a hook member 63c for attaching the wire takeup release spring 66 thereto. Thus, the wire takeup release spring 66 biases the wire takeup member 63 in a clockwise direction, i.e., a shift release direction. The upper surface of the wire takeup member 63 has a plurality of projections 63d which engage a plurality of recesses formed in the opening 62a of the positioning plate 62. Thus, the positioning plate 62 and the wire takeup member 63 are coupled together so as that they rotate together as a unit when the shifting unit 33 is in the assembled state. Thus, the wire takeup member 63 is selectively rotated in response to movement of the release lever 45 and the winding lever 50 from their respective rest position towards their respective shifting position.

The wire takeup release spring 66 is preferably a torsion spring having a first end 66a attached to the hook 63c of the wire takeup member 63, and a second end 66b coupled to the mounting plate 67. The wire takeup release spring 66 applies a biasing force to urge the wire takeup member 63 in the clockwise direction.

The spacer 65 is a hat shaped member having a flat base plate 65a and a tubular member 65b. The base member 65a is configured and arranged so as to prevent the wire takeup release spring 66 from being compressed when the shift unit 33 is assembled. The tubular portion 65b is non-rotatably secured to the lower post 40d and maintains proper spacing between the wire takeup member 63 and the compression spring 64.

The first position maintaining pawl 68 is fixedly coupled to the mounting plate via a pin 68a which is riveted onto the mounting plate 67. The first position maintaining pawl 68 is held on the mounting pin 68a by a retaining clip 68b. Moreover, the first position maintaining pawl 68 is biased in a counterclockwise direction by a torsion spring 68c as seen in FIG. 5. The torsion spring 68c has a first end of the torsion spring 68c engaging the first position maintaining pawl 68 and a second end of the torsion spring 68c engaging the mounting plate 67. Thus, the first position maintaining pawl 68 configured and arranged to selectively move between a first engagement position that holds the positioning plate 62 in one of the predetermined shift positions and a first disengagement position that releases the positioning plate 62 for rotational movement.

The second position maintaining pawl 69 is fixedly coupled to the mounting plate via a pin 69a which is riveted onto the mounting plate 67. The second position maintaining pawl 69 is held on the mounting pin 69a by a retaining clip 69b. Moreover, the second position maintaining pawl 69 is biased in a counterclockwise direction by a torsion spring 69c as seen in FIG. 5. The torsion spring 69c has a first end of the torsion spring 69c engaging the second position maintaining pawl 69 and a second end of the torsion spring 69c engaging the mounting plate 67. Thus, the second position maintaining pawl 69 configured and arranged to selectively move between a second engagement position that holds the positioning plate 62 in one of the predetermined shift positions and a second disengagement position that releases the positioning plate 62 for rotational movement.

The first and second position maintaining pawls 68 and 69 are configured and arranged to alternately engage adjacent teeth of the positioning plate 62 as the first and second position maintaining pawls 68 and 69 are moved by the rotation of the release plate to perform a shifting operation between sequential shift positions of the predetermined shift positions.

As seen in FIGS. 6 to 12, a shifting operation from the first gear position to the third gear position is illustrated in which the positioning plate 62 and the releasing plate 61 are rotated together by the rider pushing the shift winding lever 50. In particular, the rotation of the releasing plate 61 and the positioning plate 62 causes the first and second position maintaining pawls 68 and 69 to be moved and/or held out of engagement with the positioning teeth 62b of the positioning plate 62 by one of the camming teeth 61a of the releasing plate 61 against the urging force of the springs 68c and 69c. Once the releasing plate 61 and the positioning plate 62 have been moved a predetermined amount, one of the first and second position maintaining pawls 68 and 69 will be forced back into the path of the positioning teeth 62b of the positioning plate 62 by the urging force of its springs 68c or 69c, while the other of the first and second position maintaining pawls 68 and 69 will be held out of engagement from the positioning teeth 62b of the positioning plate 62 by one of the camming teeth 61a of the releasing plate 61. This shifting can be performed in a single progressively movement of the shift winding lever 50 without stopping or returning to the shift winding lever 50 to the rest position such that multiple gears shifts occur in the single shift operation.

Figure 13:
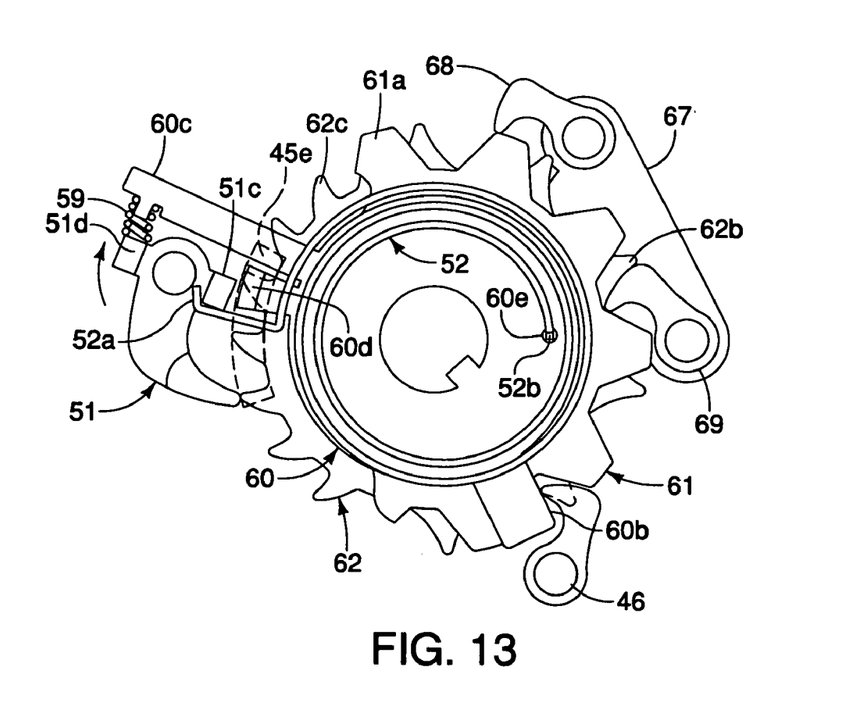
FIG. 13 is a simplified top plan view of the selected parts of the shift position control mechanism illustrated in FIGS. 6-12 in the third gear position, with the release lever being moved such that that release pawl engages a tooth of the releasing plate.
Figure 14:
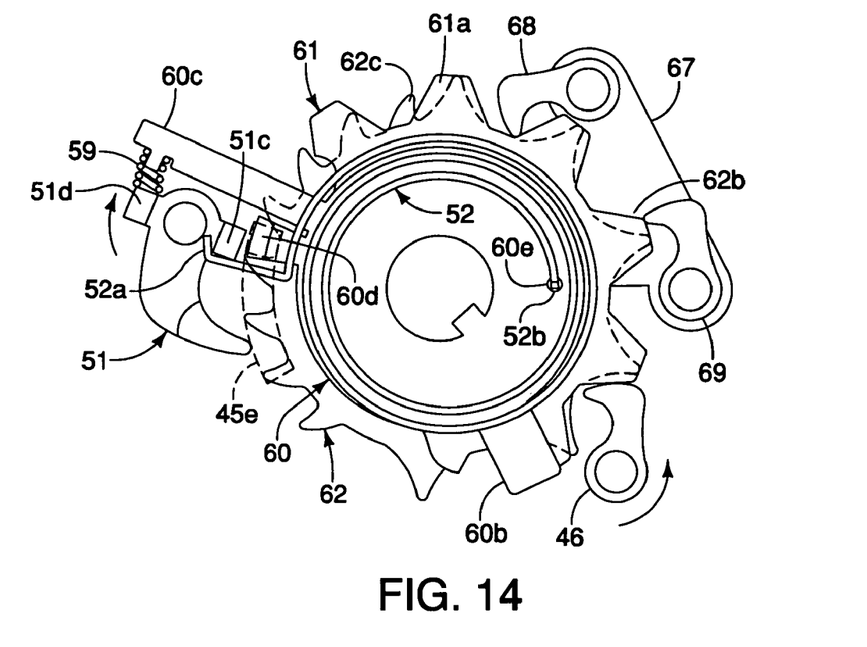
FIG. 14 is a simplified top plan view of the selected parts of the shift position control mechanism illustrated in FIGS. 6-12 in the third gear position, with the releasing plate being rotated by the release pawl of the release lever in the shift winding direction such that one of the position maintaining pawls is moved out of engagement with the positioning plate and the other position maintaining pawl moves in the path of the positioning plate for starting a shift from the third gear position to the second gear position.
Figure 15:
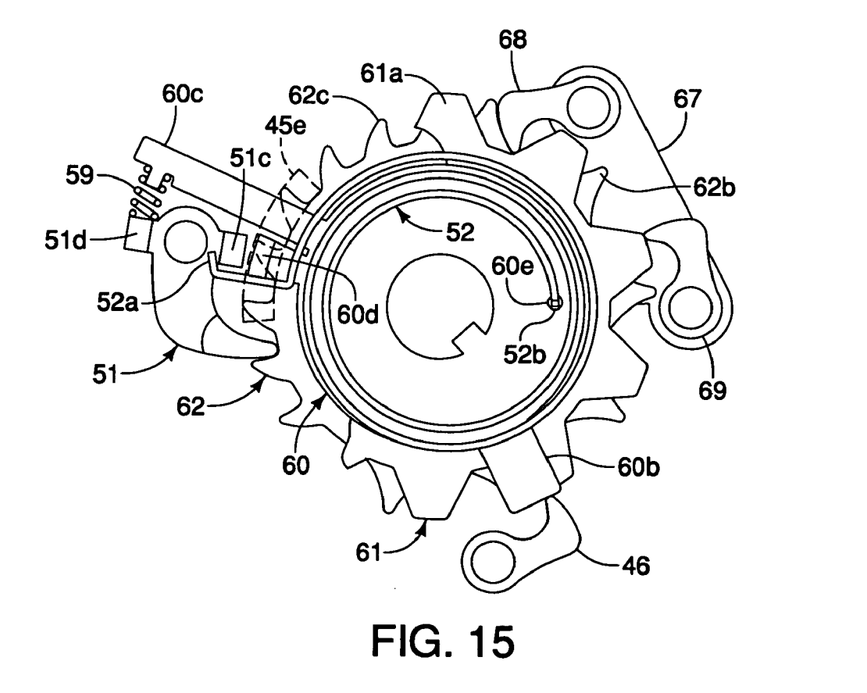
FIG. 15 is a simplified top plan view of the selected parts of the shift position control mechanism illustrated in FIGS. 1-5, with the positioning plate, the winding pawl and the release pawl in the rest position (the second gear position) after the positioning plate has been rotated by the release spring in the shift releasing direction.

Referring to FIGS. 13 to 15, a shifting operation from the third gear position to the second gear position is illustrated in which the releasing plate 61 is rotated together by the rider pushing the shift release lever 45. In particular, the rotation of the releasing plate 61 causes the first and second position maintaining pawls 68 and 69 to be moved and/or held out of engagement with the positioning teeth 62b of the positioning plate 62 by one of the camming teeth 61a of the releasing plate 61 against the urging force of the springs 68c and 69c. Once the releasing plate 61 has been moved a predetermined amount, one of the first and second position maintaining pawls 68 and 69 will be forced back into the path of the positioning teeth 62b of the positioning plate 62 by the urging force of the springs 68c and 69c, while the other of the first and second position maintaining pawls 68 and 69 will be held out of engagement from the positioning teeth 62b of the positioning plate 62 by one of the camming teeth 61a of the releasing plate 61. During movement of the shift release lever 45, the abutment 45e engages the tip of the winding pawl 51 to disengage the winding pawl 51 from the winding teeth 62c. This shifting can be performed in a single progressively movement of the shift release lever 45 without stopping or returning to the shift release lever 45 to the rest position such that multiple gears shifts occur in the single shift operation.

General Interpretation of Terms

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Also in understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift control device comprising:
   a shift winding member movably arranged between a rest position and a shifting position;
   a winding pawl movably mounted to move in response to movement of the shift winding member;
   a winding member return element configured and arranged to bias the shift winding member to the rest position and to bias the winding pawl to a pawl engagement position when the shift winding member is moved from the rest position towards the shifting position;
   a gear shifting mechanism including winding teeth that are engaged with the winding pawl; and
   a winding pawl biasing element configured and arranged to apply a biasing force to the winding pawl that urges the winding pawl to the pawl engagement position when the shift winding member is in the rest position.

2. The bicycle shift control device according to claim 1, wherein
   the winding pawl biasing element is further configured and arranged such that the winding pawl biasing element is disengaged from the winding pawl upon movement of the shift winding member to the shifting position.

3. The bicycle shift control device according to claim 2, wherein
   the gear shifting mechanism further includes a gear positioning member that includes the winding teeth and positioning teeth.

4. The bicycle shift control device according to claim 1, wherein
   the shift winding member is an operating lever that is pivotally mounted to pivot relative to a shifter housing.

5. The bicycle shift control device according to claim 1, wherein
   the winding pawl biasing element is a compression spring.

6. The bicycle shift control device according to claim 1, wherein
   the winding member return element is a torsion spring with one end of the torsion spring contacting the winding pawl to pivot the winding pawl to the pawl engagement position.

7. The bicycle shift control device according to claim 6, wherein
the gear shifting mechanism further includes a stationary stop that is arranged to contact the torsion spring when the shift winding member is in the rest position.

8. The bicycle shift control device according to claim 7, wherein
the winding pawl biasing element is further configured and arranged such that the winding pawl biasing element is disengaged from the winding pawl upon movement of the shift winding member to the shifting position.

9. The bicycle shift control device according to claim 1, wherein
the winding member return element is a torsion spring with one end of the torsion spring contacting the winding pawl to pivot the winding pawl to the pawl engagement position, and the winding pawl biasing element is a compression spring.

10. The bicycle shift control device according to claim 1, wherein
the gear shifting mechanism includes a wire takeup member that is rotated by movement of the shift winding member from the rest position towards the shifting position.

11. The bicycle shift control device according to claim 10, further comprising
a release lever operatively coupled to the gear shifting mechanism to cause the wire takeup member to rotate in a wire unwinding direction in response to movement of the release lever from a rest position towards a release position.

12. The bicycle shift control device according to claim 11, wherein
the wire takeup member is biased in a first rotational direction by the winding member return element about a pivot axis, and the shift winding member rotates in a second rotational direction opposite the first rotational direction when moved from the rest position to the shifting position.

13. The bicycle shift control device according to claim 11, wherein
the gear shifting mechanism includes a pair of position maintain pawls.

14. The bicycle shift control device according to claim 13, wherein
the position maintaining pawls are respectively rotatable about two distinct axes of rotation which are different from an axis of rotation of the winding pawl.

15. The bicycle shift control device according to claim 11, wherein
the gear shifting mechanism includes a pair of position maintain pawls and a release pawl, with the winding pawl, the position maintaining pawls and the release pawl all having distinct axes of rotation.

16. The bicycle shift control device according to claim 11, wherein
the winding member return element is a torsion spring with one end of the torsion spring contacting the winding pawl to pivot the winding pawl to the pawl engagement position, and the winding pawl biasing element is a compression spring.

17. The bicycle shift control device according to claim 11, wherein
the shift winding member, the wire takeup member and the release lever all rotate about a single axis of rotation.

* * * * *